(12) United States Patent
Xue et al.

(10) Patent No.: US 12,122,937 B2
(45) Date of Patent: Oct. 22, 2024

(54) FLEXIBLE GASTIGHT MATERIAL FOR LANDFILL SITE, AND PREPARATION METHOD AND USE METHOD THEREOF

(71) Applicant: INSTITUTE OF ROCK AND SOIL MECHANICS, CHINESE ACADEMY OF SCIENCES, Wuhan (CN)

(72) Inventors: Qiang Xue, Wuhan (CN); Bing Li, Wuhan (CN); Yong Wan, Wuhan (CN); Lei Liu, Wuhan (CN); Zhixiang Chen, Wuhan (CN)

(73) Assignee: INSTITUTE OF ROCK AND SOIL MECHANICS, CHINESE ACADEMY OF SCIENCES, Wuhan (CN)

( * ) Notice: Subject to any disclaimer, the term of this patent is extended or adjusted under 35 U.S.C. 154(b) by 50 days.

(21) Appl. No.: 17/820,881

(22) Filed: Aug. 18, 2022

(65) Prior Publication Data
US 2023/0235181 A1 Jul. 27, 2023

(30) Foreign Application Priority Data
Jan. 21, 2022 (CN) .......................... 202210074320.6

(51) Int. Cl.
| | | |
|---|---|---|
| *C08G 18/48* | (2006.01) | |
| *B05D 1/02* | (2006.01) | |
| *C08G 18/22* | (2006.01) | |
| *C08G 18/24* | (2006.01) | |
| *C08G 18/40* | (2006.01) | |
| *C08G 18/42* | (2006.01) | |
| *C08G 18/44* | (2006.01) | |
| *C08G 18/73* | (2006.01) | |
| *C08G 18/75* | (2006.01) | |
| *C08G 18/76* | (2006.01) | |
| *C08J 9/12* | (2006.01) | |
| *C09D 5/02* | (2006.01) | |
| *C09D 175/08* | (2006.01) | |

(52) U.S. Cl.
CPC ............... *C09D 5/021* (2013.01); *B05D 1/02* (2013.01); *C08G 18/227* (2013.01); *C08G 18/246* (2013.01); *C08G 18/4018* (2013.01); *C08G 18/4277* (2013.01); *C08G 18/44* (2013.01); *C08G 18/4812* (2013.01); *C08G 18/4825* (2013.01); *C08G 18/4829* (2013.01); *C08G 18/4854* (2013.01); *C08G 18/73* (2013.01); *C08G 18/755* (2013.01); *C08G 18/7614* (2013.01); *C08G 18/7671* (2013.01); *C08J 9/125* (2013.01); *C09D 175/08* (2013.01); *C08G 2150/60* (2013.01); *C08J 2201/022* (2013.01); *C08J 2203/10* (2013.01); *C08J 2375/08* (2013.01)

(58) Field of Classification Search
CPC .... C08G 18/10; C08G 2101/00; C08G 18/12; C08G 18/227; C08G 18/246; C08G 18/4018; C08G 18/4277; C08G 18/44; C08G 18/4804; C08G 18/4812; C08G 18/4825; C08G 18/4829; C08G 18/4854; C08G 18/73; C08G 18/755; C08G 18/7614; C08G 18/7621; C08G 18/7664; C08G 18/7671; C08G 2110/0008; C08G 2110/0083; C08G 2150/60; C08G 2190/00; B05D 1/02; C08J 9/125; C08J 2201/022; C08J 2203/10; C08J 2375/08; C09D 5/021; C09D 175/08; C09J 175/04; C09J 175/08
See application file for complete search history.

(56) References Cited

U.S. PATENT DOCUMENTS

2018/0187391 A1  7/2018  Bringue Campi et al.

FOREIGN PATENT DOCUMENTS

CN  106632961 A  *  5/2017  ............. C08G 18/10

OTHER PUBLICATIONS

First Office Action prepared by the State Intellectual Property Office of the P.R. China for 202210074320.6, Aug. 29, 2022, 6 pages.

* cited by examiner

Primary Examiner — John M Cooney
(74) Attorney, Agent, or Firm — Syncoda LLC; Feng Ma

(57) ABSTRACT

A flexible gastight material for a landfill site includes a component A and a component B, the component A including: at least one of polypropylene glycol with a molecular weight of 600-4000, polytetrahydrofuran diol with a molecular weight of 1000-3000, polycaprolactone diol with a molecular weight of 1000-3000, and polycarbonate diol with a molecular weight of 1000-3000; and at least one of 2,4'-diphenylmethane diisocyanate, 4,4'-diphenylmethane diisocyanate, toluene diisocyanate, isophorone diisocyanate, and hexamethylene diisocyanate. The flexible gastight material for the landfill site provided in the present application has a micro-closed-cell foam structure. The closed-cell elastic structure of the flexible gastight material may block the volatilization of toxic and harmful odors, and may cut off the diffusion path of the odors by combining with gas treatment systems at the landfill site. The flexible gastight material has excellent water blocking and gas sealing performance.

6 Claims, No Drawings

FLEXIBLE GASTIGHT MATERIAL FOR LANDFILL SITE, AND PREPARATION METHOD AND USE METHOD THEREOF

CROSS-REFERENCE OF RELATED APPLICATIONS

The present applications claims priority to Chinese Patent Application No. 202210074320.6 filed on Jan. 21, 2022, the disclosure of which is hereby incorporated by reference in its entirety.

BACKGROUND

In China, the annual transportation volume of municipal garbage is about 230 million tons. Except for a small part being incinerated, composted or recycled, more than 70% of the garbage will be transported to landfill sites or incineration plants for treatment. The classification of garbage in China can be mainly divided into four categories: recyclable garbage, toxic and hazardous garbage, kitchen garbage, and other garbage. Generally, the recyclable garbage and kitchen garbage can be degraded according to a method of secondary production and processing, and the pollution to the environment is relatively small. However, the garbage that cannot be degraded or secondary reprocessed might only be disposed of by a landfill treatment in the landfill sites. Furthermore, the landfill garbage will not be treated harmlessly, so odorous gas caused by the decay and disposal of the garbage will bring environmental pollution to the landfill site and the surrounding environment, affecting the physical and mental health of workers and nearby residents. Meanwhile, the emission of a large amount of toxic and harmful gases, such as Freon, benzene-based compounds, ammonia, and hydrogen sulfide, also has a huge impact on the realization of the current goals for peak carbon emission and carbon neutrality.

At present, the main treatment method for landfill offensive odor is deodorant spraying. The use of deodorant can effectively curb the dispersion and spread of landfill offensive odor to a certain extent, but the deodorant generally has a short duration, and cannot meet the requirement for long-term deodorization.

SUMMARY

The present application relates to the technical field of gas sealing, and specifically to a flexible gastight material for a landfill site and a preparation method and a use method thereof.

In view of the defects in some implementations, an object of the present application is to provide a flexible gastight material for a landfill site and a preparation method and a use method thereof, so as to solve the problems mentioned above in the background.

In order to solve the technical problem, the present application adopts the following technical solutions.

The present application provides a flexible gastight material for a landfill site, the flexible gastight material includes a component A and a component B, wherein the component A includes:
 (1) at least one of polypropylene glycol with a molecular weight of 600-4000, polytetrahydrofuran diol with a molecular weight of 1000-3000, polycaprolactone diol with a molecular weight of 1000-3000, and polycarbonate diol with a molecular weight of 1000-3000; and
 (2) at least one of 2,4'-diphenylmethane diisocyanate, 4,4'-diphenylmethane diisocyanate, toluene diisocyanate, isophorone diisocyanate, and hexamethylene diisocyanate;
the component B includes:
 (1) a polyol, a molecular structure of the polyol having a covalent organic framework structure;
 (2) at least one of polyether triol with a molecular weight of 300-500 and polyether triol with a molecular weight of 1000-1500;
 (3) deionized water;
 (4) a catalyst, being one of dibutyltin dilaurate and bismuth carboxylate; and
 (5) at least one of polypropylene glycol with a molecular weight of 600-4000, polytetrahydrofuran diol with a molecular weight of 1000-3000, polycaprolactone diol with a molecular weight of 1000-3000, and polycarbonate diol with a molecular weight of 1000-3000.

As a further technical solution to the present application, the component A includes:
 (1) at least one of polypropylene glycol with a molecular weight of 1500-2800, polytetrahydrofuran diol with a molecular weight of 1500-2500, polycaprolactone diol with a molecular weight of 1500-2500, and polycarbonate diol with a molecular weight of 1500-2500; and
 (2) at least one of 2,4'-diphenylmethane diisocyanate, 4,4'-diphenylmethane diisocyanate, toluene diisocyanate, isophorone diisocyanate, and hexamethylene diisocyanate;
the component B includes:
 (1) a polyol, a molecular structure of the polyol having a covalent organic framework structure;
 (2) at least one of polyether triol with a molecular weight of 350-450 and polyether triol with a molecular weight of 1100-1400;
 (3) deionized water;
 (4) a catalyst, being one of dibutyltin dilaurate and bismuth carboxylate; and
 (5) at least one of polypropylene glycol with a molecular weight of 1500-2800, polytetrahydrofuran diol with a molecular weight of 1500-2500, polycaprolactone diol with a molecular weight of 1500-2500, and polycarbonate diol with a molecular weight of 1500-2500.

As a further technical solution to the present application, the component A includes:
 (1) at least one of polypropylene glycol with a molecular weight of 2000, polytetrahydrofuran diol with a molecular weight of 2000, polycaprolactone diol with a molecular weight of 2000, and polycarbonate diol with a molecular weight of 2000; and
 (2) at least one of 2,4'-diphenylmethane diisocyanate, 4,4'-diphenylmethane diisocyanate, toluene diisocyanate, isophorone diisocyanate, and hexamethylene diisocyanate;
the component B includes:
 (1) a polyol, a molecular structure of the polyol having a covalent organic framework structure;
 (2) at least one of polyether triol with a molecular weight of 400 and polyether triol with a molecular weight of 1250;
 (3) deionized water;
 (4) a catalyst, being one of dibutyltin dilaurate and bismuth carboxylate; and
 (5) at least one of polypropylene glycol with a molecular weight of 2000, polytetrahydrofuran diol with a molecular weight of 2000, polycaprolactone diol with a molecular weight of 2000, and polycarbonate diol with a molecular weight of 2000.

The present application further provides a preparation method of a flexible gastight material for a landfill site, wherein the flexible gastight material includes a component A and a component B, preparation of the component A includes the following steps:

Step 1, heating a temperature of 50-100 parts by mass of at least one of polypropylene glycol, polytetrahydrofuran diol, polycaprolactone diol, and polycarbonate diol to 120° C., and removing water under vacuum-pumping for 1 hour; and Step 2, decreasing the temperature to 80° C., and adding 200-400 parts by mass of at least one of 2,4'-diphenylmethane diisocyanate, 4,4'-diphenylmethane diisocyanate, toluene diisocyanate, isophorone diisocyanate, and hexamethylene diisocyanate to react for 2 hours, to yield the component A.

As a further technical solution to the present application, the preparation of the component B includes the following steps:

mixing thoroughly 1-3 parts by mass of a polyol having a covalent organic framework structure in its molecular structure, 200-300 parts by mass of at least one of polyether triol with a molecular weight of 300-500 and polyether triol with a molecular weight of 1000-1500, 3-8 parts by mass of deionized water, 5-15 parts by mass of a catalyst, and 100-150 parts by mass of at least one of polypropylene glycol, polytetrahydrofuran diol, polycaprolactone diol and polycarbonate diol by stirring, to yield the component B.

As a further technical solution to the present application, the preparation of the component A includes the following steps:

Step 1, heating a temperature of 65-85 parts by mass of at least one of polypropylene glycol, polytetrahydrofuran diol, polycaprolactone diol, and polycarbonate diol to 120° C., and removing water under vacuum-pumping for 1 hour; and Step 2, decreasing the temperature to 80° C., and adding 250-350 parts by mass of at least one of 2,4'-diphenylmethane diisocyanate, 4,4'-diphenylmethane diisocyanate, toluene diisocyanate, isophorone diisocyanate, and hexamethylene diisocyanate to react for 2 hours, to yield the component A.

As a further technical solution to the present application, the preparation of the component A includes the following steps:

Step 1, heating a temperature of 75 parts by mass of polypropylene glycol to 120° C., and removing water under vacuum-pumping for 1 hour;

Step 2, decreasing the temperature to 80° C., and adding 300 parts by mass of at least one of 2,4'-diphenylmethane diisocyanate, 4,4'-diphenylmethane diisocyanate, toluene diisocyanate, isophorone diisocyanate, and hexamethylene diisocyanate to react for 2 hours, to yield the component A.

As a further technical solution to the present application, the preparation of the component B includes the following steps:

mixing thoroughly 1.5-2.5 parts by mass of a polyol, having a covalent organic framework structure in its molecular structure, 230-270 parts by mass of at least one of polyether triol with a molecular weight of 300-500 and polyether triol with a molecular weight of 1000-1500, 4-7 parts by mass of deionized water, 8-12 parts by mass of a catalyst, and 120-130 parts by mass of at least one of polypropylene glycol, polytetrahydrofuran diol, polycaprolactone diol and polycarbonate diol by stirring, to yield the component B.

As a further technical solution to the present application, the preparation of the component B includes the following steps:

mixing thoroughly 2.0 parts by mass of a polyol having a covalent organic framework structure in its molecular structure, 250 parts by mass of at least one of polyether triol with a molecular weight of 300-500 and polyether triol with a molecular weight of 1000-1500, 5 parts by mass of deionized water, 10 parts by mass of a catalyst, and 125 parts by mass of at least one of polypropylene glycol, polytetrahydrofuran diol, polycaprolactone diol and polycarbonate diol by stirring, to yield the component B.

The present application further provides a method of a flexible gastight material for a landfill site, wherein prepared materials A and B are sprayed to a location in the landfill site where gas sealing is required using a high-pressure two-component spraying device with screw mixing; the flexible gastight material is accurately metered to a mass ratio of A:B of (1-2):1, and has a spraying amount being controlled at 0.5-2 kg/m$^2$; after spraying, the gastight material self-foams within 0.5-2 hours to produce the flexible gastight material with good gas sealing performance.

The flexible gastight material for a landfill site provided in the present application has a micro-closed-cell foam structure. The closed-cell elastic structure of the flexible gastight material may block the volatilization of toxic and harmful odors and may cut off the diffusion path of the odors by combining them with gas treatment systems in the landfill site. The flexible gastight material has excellent water blocking and gas sealing performance.

Moreover, the gastight material provided in the present application has the advantages of a simple construction process, fast gas sealing, and long duration, which is conducive to reducing carbon emissions to the atmospheric environment and has significant social and environmental benefits.

DETAILED DESCRIPTION

The technical solutions in the embodiments of the present application will be clearly and completely described below with reference to specific examples. Obviously, the described examples are only a part, rather than all, of the embodiments of the present application. All other embodiments that can be obtained by those of ordinary skill in the art based on the examples of the present application without creative efforts shall fall within the protection scope of the present application.

Embodiment 1

The embodiment 1 provides a flexible gastight material for a landfill site including a component A and a component B, wherein the component A includes:

(1) at least one of polypropylene glycol with a molecular weight of 600, polytetrahydrofuran diol with a molecular weight of 1000, polycaprolactone diol with a molecular weight of 1000, and polycarbonate diol with a molecular weight of 1000; and (2) at least one of 2,4'-diphenylmethane diisocyanate, 4,4'-diphenylmethane diisocyanate, toluene diisocyanate, isophorone diisocyanate, and hexamethylene diisocyanate;

the component B includes:
(1) a polyol having a covalent organic framework structure in its molecular structure;
(2) at least one of polyether triol with a molecular weight of 300 and polyether triol with a molecular weight of 1000;
(3) deionized water;
(4) a catalyst, being one of dibutyltin dilaurate and bismuth carboxylate; and
(5) at least one of polypropylene glycol with a molecular weight of 600, polytetrahydrofuran diol with a molecular weight of 1000, polycaprolactone diol with a molecular weight of 1000, and polycarbonate diol with a molecular weight of 1000.

The embodiment 1 also provides a preparation method of a flexible gastight material for a landfill site, wherein the flexible gastight material includes a component A and a component B, preparation of the component A includes the following steps:

Step 1, heating a temperature of 50 parts by mass of at least one of polypropylene glycol, polytetrahydrofuran diol, polycaprolactone diol, and polycarbonate diol to 120° C., and removing water under vacuum-pumping for 1 hour; and Step 2, decreasing the temperature to 80° C., and adding 200 parts by mass of at least one of 2,4'-diphenylmethane diisocyanate, 4,4'-diphenylmethane diisocyanate, toluene diisocyanate, isophorone diisocyanate, and hexamethylene diisocyanate to react for 2 hours, to yield the component A.

As a further technical solution to the present embodiment, preparation of the component B includes the following steps:

mixing thoroughly 1 part by mass of a polyol having a covalent organic framework structure in its molecular structure, 200 parts by mass of at least one of polyether triol with a molecular weight of 300 and polyether triol with a molecular weight of 1000, 3 parts by mass of deionized water, 5 parts by mass of a catalyst, and 100 parts by mass of at least one of polypropylene glycol, polytetrahydrofuran diol, polycaprolactone diol and polycarbonate diol by stirring, to yield the component B.

The embodiment 1 also provides a use method of a flexible gastight material for a landfill site, wherein prepared materials A and B are sprayed to a location in the landfill site where gas sealing is required using a high-pressure two-component spraying device with screw mixing; the gastight material is accurately metered to a mass ratio of A:B of (1-2):1, and has a spraying amount being controlled at 0.5-2 kg/m$^2$; after spraying, the gastight material self-foams within 0.5-2 hours to produce the flexible gastight material with good gas sealing performance.

Embodiment 2

The embodiment 2 provides a flexible gastight material for a landfill site including a component A and a component B, wherein the component A includes:
(1) at least one of polypropylene glycol with a molecular weight of 4000, polytetrahydrofuran diol with a molecular weight of 3000, polycaprolactone diol with a molecular weight of 3000, and polycarbonate diol with a molecular weight of 3000; and
(2) at least one of 2,4'-diphenylmethane diisocyanate, 4,4'-diphenylmethane diisocyanate, toluene diisocyanate, isophorone diisocyanate, and hexamethylene diisocyanate;

the component B includes:
(1) a polyol having a covalent organic framework structure in its molecular structure;
(2) at least one of polyether triol with a molecular weight of 500 and polyether triol with a molecular weight of 1500;
(3) deionized water;
(4) a catalyst, being one of dibutyltin dilaurate and bismuth carboxylate; and
(5) at least one of polypropylene glycol with a molecular weight of 4000, polytetrahydrofuran diol with a molecular weight of 3000, polycaprolactone diol with a molecular weight of 3000, and polycarbonate diol with a molecular weight of 3000.

The embodiment 2 also provides a preparation method of a flexible gastight material for a landfill site, wherein the flexible gastight material includes a component A and a component B, preparation of the component A includes the following steps:

Step 1, heating a temperature of 100 parts by mass of at least one of polypropylene glycol, polytetrahydrofuran diol, polycaprolactone diol, and polycarbonate diol to 120° C., and removing water under vacuum-pumping for 1 hour; and Step 2, decreasing the temperature to 80° C., and adding 400 parts by mass of at least one of 2,4'-diphenylmethane diisocyanate, 4,4'-diphenylmethane diisocyanate, toluene diisocyanate, isophorone diisocyanate, and hexamethylene diisocyanate to react for 2 hours, to yield the component A.

As a further technical solution to the present embodiment, preparation of the component B includes the following steps:

mixing thoroughly 1-3 parts by mass of a polyol having a covalent organic framework structure in its molecular structure, 300 parts by mass of at least one of polyether triol with a molecular weight of 500 and polyether triol with a molecular weight of 1500, 8 parts by mass of deionized water, 15 parts by mass of a catalyst, and 150 parts by mass of at least one of polypropylene glycol, polytetrahydrofuran diol, polycaprolactone diol and polycarbonate diol by stirring, to yield the component B.

The embodiment 2 also provides a use method of a flexible gastight material for a landfill site, wherein prepared materials A and B are sprayed to a location in the landfill site where gas sealing is required using a high-pressure two-component spraying device with screw mixing; the gastight material is accurately metered to a mass ratio of A:B of (1-2):1, and has a spraying amount being controlled at 0.5-2 kg/m$^2$; after spraying, the gastight material self-foams within 0.5-2 hours to produce the flexible gastight material with good gas sealing performance.

Embodiment 3

The embodiment 3 provides a flexible gastight material for a landfill site including a component A and a component B, wherein the component A includes:
(1) at least one of polypropylene glycol with a molecular weight of 1500, polytetrahydrofuran diol with a molecular weight of 1500, polycaprolactone diol with a molecular weight of 1500, and polycarbonate diol with a molecular weight of 1500; and (2) at least one of 2,4'-diphenylmethane diisocyanate, 4,4'-diphenylmethane diisocyanate, toluene diisocyanate, isophorone diisocyanate, and hexamethylene diisocyanate;

the component B includes:

(1) a polyol having a covalent organic framework structure in its molecular structure;

(2) at least one of polyether triol with a molecular weight of 350 and polyether triol with a molecular weight of 1100;

(3) deionized water;

(4) a catalyst, being one of dibutyltin dilaurate and bismuth carboxylate; and (5) at least one of polypropylene glycol with a molecular weight of 1500, polytetrahydrofuran diol with a molecular weight of 1500, polycaprolactone diol with a molecular weight of 1500, and polycarbonate diol with a molecular weight of 1500.

The embodiment 3 also provides a preparation method of a flexible gastight material for a landfill site, wherein the flexible gastight material includes a component A and a component B, preparation of the component A includes the following steps:

Step 1, heating a temperature of 65 parts by mass of at least one of polypropylene glycol, polytetrahydrofuran diol, polycaprolactone diol, and polycarbonate diol to 120° C., and removing water under vacuum-pumping for 1 hour; and Step 2, decreasing the temperature to 80° C., and adding 250 parts by mass of at least one of 2,4'-diphenylmethane diisocyanate, 4,4'-diphenylmethane diisocyanate, toluene diisocyanate, isophorone diisocyanate, and hexamethylene diisocyanate to react for 2 hours, to yield the component A.

As a further technical solution to the present embodiment, the preparation of the component B includes the following steps:

mixing thoroughly 1.5 parts by mass of a polyol having a covalent organic framework structure in its molecular structure, 230 parts by mass of at least one of polyether triol with a molecular weight of 350 and polyether triol with a molecular weight of 1100, 4 parts by mass of deionized water, 8 parts by mass of a catalyst, and 120 parts by mass of at least one of polypropylene glycol, polytetrahydrofuran diol, polycaprolactone diol and polycarbonate diol by stirring, to yield the component B.

The embodiment 3 also provides a use method of a flexible gastight material for a landfill site, wherein prepared materials A and B are sprayed to a location in the landfill site where gas sealing is required using a high-pressure two-component spraying device with screw mixing; the gastight material is accurately metered to a mass ratio of A:B of (1-2):1, and has a spraying amount being controlled at 0.5-2 kg/m$^2$; after spraying, the gastight material self-foams within 0.5-2 hours to produce the flexible gastight material with good gas sealing performance.

Embodiment 4

The embodiment 4 provides a flexible gastight material for a landfill site including a component A and a component B, wherein the component A includes:

(1) at least one of polypropylene glycol with a molecular weight of 2800, polytetrahydrofuran diol with a molecular weight of 2500, polycaprolactone diol with a molecular weight of 2500, and polycarbonate diol with a molecular weight of 2500; and (2) at least one of 2,4'-diphenylmethane diisocyanate, 4,4'-diphenylmethane diisocyanate, toluene diisocyanate, isophorone diisocyanate, and hexamethylene diisocyanate;

the component B includes:

(1) a polyol having a covalent organic framework structure in its molecular structure;

(2) at least one of polyether triol with a molecular weight of 450 and polyether triol with a molecular weight of 1400;

(3) deionized water;

(4) a catalyst, being one of dibutyltin dilaurate and bismuth carboxylate; and (5) at least one of polypropylene glycol with a molecular weight of 2800, polytetrahydrofuran diol with a molecular weight of 2500, polycaprolactone diol with a molecular weight of 2500, and polycarbonate diol with a molecular weight of 2500.

The embodiment 4 also provides a preparation method of a flexible gastight material for a landfill site, wherein the flexible gastight material includes a component A and a component B, preparation of the component A comprises the following steps:

Step 1, heating a temperature of 85 parts by mass of at least one of polypropylene glycol, polytetrahydrofuran diol, polycaprolactone diol, and polycarbonate diol to 120° C., and removing water under vacuum-pumping for 1 hour; and Step 2, decreasing the temperature to 80° C., and adding 350 parts by mass of at least one of 2,4'-diphenylmethane diisocyanate, 4,4'-diphenylmethane diisocyanate, toluene diisocyanate, isophorone diisocyanate, and hexamethylene diisocyanate to react for 2 hours, to yield the component A.

As a further technical solution to the present embodiment, preparation of the component B comprises the following steps:

mixing thoroughly 2.5 parts by mass of a polyol having a covalent organic framework structure in its molecular structure, 270 parts by mass of at least one of polyether triol with a molecular weight of 450 and polyether triol with a molecular weight of 1400, 7 parts by mass of deionized water, 12 parts by mass of a catalyst, and 130 parts by mass of at least one of polypropylene glycol, polytetrahydrofuran diol, polycaprolactone diol and polycarbonate diol by stirring, to yield the component B.

The embodiment 4 also provides a use method of a flexible gastight material for a landfill site, wherein prepared materials A and B are sprayed to a location in the landfill site where gas sealing is required using a high-pressure two-component spraying device with screw mixing; the gastight material is accurately metered to a mass ratio of A:B of (1-2):1, and has a spraying amount being controlled at 0.5-2 kg/m$^2$; after spraying, the gastight material self-foams within 0.5-2 hours to produce the flexible gastight material with good gas sealing performance.

Embodiment 5

The embodiment 5 provides a flexible gastight material for a landfill site including a component A and a component B, wherein the component A includes:

(1) at least one of polypropylene glycol with a molecular weight of 2000, polytetrahydrofuran diol with a molecular weight of 2000, polycaprolactone diol with a molecular weight of 2000, and polycarbonate diol with a molecular weight of 2000; and (2) at least one of 2,4'-diphenylmethane diisocyanate, 4,4'-diphenylmethane diisocyanate, toluene diisocyanate, isophorone diisocyanate, and hexamethylene diisocyanate;

the component B includes:

(1) a polyol having a covalent organic framework structure in its molecular structure;

(2) at least one of polyether triol with a molecular weight of 400 and polyether triol with a molecular weight of 1250;

(3) deionized water;

(4) a catalyst, being one of dibutyltin dilaurate and bismuth carboxylate; and (5) at least one of polypropylene glycol with a molecular weight of 2000, polytetrahydrofuran diol with a molecular weight of 2000, polycaprolactone diol with a molecular weight of 2000, and polycarbonate diol with a molecular weight of 2000.

The embodiment 5 also provides a preparation method of a flexible gastight material for a landfill site, wherein the flexible gastight material includes a component A and a component B, preparation of the component A includes the following steps:

Step 1, heating a temperature of 75 parts by mass of at least one of polypropylene glycol, polytetrahydrofuran diol, polycaprolactone diol, and polycarbonate diol to 120° C., and removing water under vacuum-pumping for 1 hour; and Step 2, decreasing the temperature to 80° C., and adding 300 parts by mass of at least one of 2,4'-diphenylmethane diisocyanate, 4,4'-diphenylmethane diisocyanate, toluene diisocyanate, isophorone diisocyanate, and hexamethylene diisocyanate to react for 2 hours, to yield the component A.

As a further technical solution to the present embodiment, preparation of the component B includes the following steps:

mixing thoroughly 2.0 parts by mass of a polyol having a covalent organic framework structure in its molecular structure, 250 parts by mass of at least one of polyether triol with a molecular weight of 400 and polyether triol with a molecular weight of 1250, 5 parts by mass of deionized water, 10 parts by mass of a catalyst, and 125 parts by mass of at least one of polypropylene glycol, polytetrahydrofuran diol, polycaprolactone diol and polycarbonate diol by stirring, to yield the component B.

The embodiment 5 also provides a use method of a flexible gastight material for a landfill site, wherein prepared materials A and B are sprayed to a location in the landfill site where gas sealing is required using a high-pressure two-component spraying device with screw mixing; the gastight material is accurately metered to a mass ratio of A:B of (1-2):1, and has a spraying amount being controlled at 0.5-2 kg/m², after spraying, the gastight material self-foams within 0.5-2 hours to produce the flexible gastight material with good gas sealing performance.

Comparative Example 1

The comparative example 1 provides a flexible gastight material for a landfill site including a component A and a component B, and a preparation method of the flexible gastight material for a landfill site, wherein preparation of the component A includes the following steps:

Step 1, heating a temperature of 75 parts by mass of PBA with a molecular weight of 2000 to 120° C., and removing water under vacuum-pumping for 1 hour; and Step 2, decreasing the temperature to 80° C. and adding 300 parts by mass of 2,4'-diphenylmethane diisocyanate to react for 2 hours, to yield the component A.

As a further technical solution to the present embodiment, preparation of the component B includes the following steps: mixing thoroughly 2.0 parts by mass of a polyol having a covalent organic framework structure in its molecular structure, 250 parts by mass of polyether triol with a molecular weight of 3000, 5 parts by mass of deionized water, 10 parts by mass of a catalyst, and 125 parts by mass of polypropylene glycol by stirring, to yield the component B.

The comparative example 1 also provides a use method of a flexible gastight material for a landfill site, wherein prepared materials A and B are sprayed to a location in the landfill site where gas sealing is required using a high-pressure two-component spraying device with screw mixing; the gastight material is accurately metered to a mass ratio of A:B of (1-2):1, and has a spraying amount being controlled at 0.5-2 kg/m²; after spraying, the gastight material self-foams within 0.5-2 hours to produce the flexible gastight material with good gas sealing performance.

Comparative Example 2

The comparative example 2 provides a flexible gastight material for a landfill site including a component A and a component B, and a preparation method of the flexible gastight material for a landfill site, wherein preparation of the component A includes the following steps:

Step 1, heating a temperature of 75 parts by mass of poly(terephthalic acid-butanediol-isopentyl glycol) ester diol with a molecular weight of 2000 to 120° C., and removing water under vacuum-pumping for 1 hour; and Step 2, decreasing the temperature to 80° C. and adding 300 parts by mass of isophorone diisocyanate to react for 2 hours, to yield the component A.

As a further technical solution to the comparative example 2, preparation of the component B includes the following steps: mixing thoroughly 2.0 parts by mass of a polyol having a covalent organic framework structure in its molecular structure, 250 parts by mass of polyether triol with a molecular weight of 3000, 5 parts by mass of deionized water, and 10 parts of a catalyst by stirring, to yield the component B.

The comparative example 2 also provides a use method of a flexible gastight material for a landfill site, wherein prepared materials A and B are sprayed to a location in the landfill site where gas sealing is required using a high-pressure two-component spraying device with screw mixing; the gastight material is accurately metered to a mass ratio of A:B of (1-2):1, and has a spraying amount being controlled at 0.5-2 kg/m²; after spraying, the gastight material self-foams within 0.5-2 hours to produce the flexible gastight material with good gas sealing performance.

Comparative Example 3

A landfill deodorizing covering coating material implemented according to Embodiment 1 of the CN patent application No. 201910374996.5: sequentially mixing 400 parts of wood fiber, 300 parts of high-viscosity bentonite, 75 parts of anionic polyacrylamide, 50 parts of a facultative bacteria preparation of bacillus and yeasts, 4000 parts water, all of them being metered by mass, and putting the mixer into a sprayer, and carrying out a continuous evenly stirring in both forward and reverse directions with a stirring speed of 25 r/min and a stirring time of 30 min.

The landfill deodorizing covering coating material prepared as above was sprayed onto the surface of garbage by a sprayer gun to form a 6 mm uniform coating, which was naturally cured at 50 min.

Comparative Example 4

The comparative example 4 provides a polymer fiber spraying agent for garbage coverage implemented according to Embodiment 1 of the CN patent application No. 201710455284.7: adding 0.03 kilograms of polyvinyl alcohol into 1 kilograms of water, and after stirring for 25 minutes, adding 0.3 kilograms of waste paper pulp and stirring for 60 minutes to obtain a slurry.

The obtained slurry was evenly sprayed on the garbage dump with a sprayer to form a closed uniform coverage with a thickness of 0.8 cm.

The gastight materials of Embodiments 1-5 and Comparative Examples 1~4 were tested for mechanical properties by using a tensile testing machine.

An odor sensor was used as a device for detecting odor concentration. A resistance value of a semiconductor set in the odor sensor would change with surface molecular adsorption and surface reaction during detection, so it could detect trace odors with high sensitivity. At the same time, by changing the semiconductor material or catalyst in the odor sensor, characteristics such as reducing sensitivity to odorless gas components were realized.

Two different sites were randomly selected in a landfill, and the odor concentration value on the surface of the garbage was detected. Later, the materials with different formulations from Embodiments 1-5 and Comparative Examples 1~4 were uniformly sprayed on the surface. After the curing was completed, the odor concentration was detected in the sprayed areas, and a removal rate of the odor concentration was calculated by using the detected value of the odor concentration.

The following test data were obtained through field tests:

harmful odors, and may cut off the diffusion path of the odors by combining with gas treatment systems in the landfill site. The material has excellent water blocking and gas sealing performance.

Moreover, the gastight material provided in the present application has the advantages of a simple construction process, fast gas sealing, and long duration, which is conducive to reducing carbon emissions to the atmospheric environment and has significant social and environmental benefits.

It will be apparent to those skilled in the art that the present application is not limited to the details of the above-described exemplary embodiments, and may be embodied in other specific forms without departing from the spirit or essential characteristics of the present application. Therefore, the embodiments are to be regarded in all respects as illustrative rather than restrictive. The scope of the present application is to be defined by the appended claims rather than the foregoing description. Therefore, it is intended that all changes that come within the meaning and range of equivalents of the claims are encompassed within the present application.

In addition, it should be understood that although this specification is described in terms of embodiments, each embodiment is intended to include more than one independent technical solution. These recitations in the specification are only for the sake of clarity, and those skilled in the art should take the specification as a whole, such that the technical solutions in various embodiments can be appropriately combined to form other embodiments that can be understood by those skilled in the art.

The invention claimed is:

1. A preparation method of a flexible gastight material for a landfill site, wherein the flexible gastight material comprises a component A and a component B, preparation of the component A comprises the following steps:

Step 1, heating a temperature of 50-100 parts by mass of at least one of polypropylene glycol, polytetrahydrofuran diol, polycaprolactone diol, and polycarbonate diol to 120° C., and removing water under vacuum-pumping for 1 hour;

Step 2, decreasing the temperature to 80° C., and adding 200-400 parts by mass of at least one of 2,4'-diphenyl-

| Example | Elongation at break (%) | Breaking strength (MPa) | Odor concentration | | Odor removal rate (%) | 90-day retention rate (%) |
| --- | --- | --- | --- | --- | --- | --- |
| | | | Before treatment | After treatment | | |
| Embodiment 1 | 312 | 3.7 | 313 | 9 | 96.8 | 95.2 |
| Embodiment 2 | 357 | 4.2 | 307 | 15 | 95.1 | 94.7 |
| Embodiment 3 | 331 | 3.8 | 295 | 13.6 | 95.4 | 94.6 |
| Embodiment 4 | 362 | 3.9 | 213 | 8.1 | 96.2 | 95.6 |
| Embodiment 5 | 343 | 3.9 | 272 | 12.3 | 95.5 | 95.1 |
| Comparative Example 1 | 87 | 2.1 | 281 | 46.9 | 83.3 | 74.3 |
| Comparative Example 2 | 127 | 1.5 | 351 | 75.8 | 78.4 | 69.1 |
| Comparative Example 3 | — | — | 289 | 107.8 | 62.7 | 34.8 |
| Comparative Example 4 | — | — | 267 | 108.7 | 59.3 | 21.1 |

The flexible gastight material for a landfill site provided in the present application has a micro-closed-cell foam structure. The closed-cell elastic structure of the flexible gastight material may block the volatilization of toxic and methane diisocyanate, 4,4'-diphenylmethane diisocyanate, toluene diisocyanate, isophorone diisocyanate, and hexamethylene diisocyanate to react for 2 hours, to yield the component A;

wherein preparation of the component B comprises:
mixing thoroughly 1-3 parts by mass of a polyol having a covalent organic framework structure in its molecular structure, 200-300 parts by mass of at least one of polyether triol with a molecular weight of 300-500 and polyether triol with a molecular weight of 1000-1500, 3-8 parts by mass of deionized water, 5-15 parts by mass of a catalyst, and 100-150 parts by mass of at least one of polypropylene glycol, polytetrahydrofuran diol, polycaprolactone diol and polycarbonate diol by stirring, to yield the component B.

2. The preparation method for the flexible gastight material for the landfill site according to claim 1, wherein preparation of the component A comprises the following steps:
Step 1, heating a temperature of 65-85 parts by mass of at least one of polypropylene glycol, polytetrahydrofuran diol, polycaprolactone diol, and polycarbonate diol to 120° C., and removing water under vacuum-pumping for 1 hour; and
Step 2, decreasing the temperature to 80° C., and adding 250-350 parts by mass of at least one of 2,4'-diphenylmethane diisocyanate, 4,4'-diphenylmethane diisocyanate, toluene diisocyanate, isophorone diisocyanate, and hexamethylene diisocyanate to react for 2 hours, to yield the component A.

3. The preparation method of the flexible gastight material for the landfill site according to claim 2, wherein preparation of the component A comprises the following steps:
Step 1, heating a temperature of 75 parts by mass of polypropylene glycol to 120° C., and removing water under vacuum-pumping for 1 hour;
Step 2, decreasing the temperature to 80° C., and adding 300 parts by mass of at least one of 2,4'-diphenylmethane diisocyanate, 4,4'-diphenylmethane diisocyanate, toluene diisocyanate, isophorone diisocyanate, and hexamethylene diisocyanate to react for 2 hours, to yield the component A.

4. The preparation method of the flexible gastight material for the landfill site according to claim 1, wherein preparation of the component B comprises:
mixing thoroughly 1.5-2.5 parts by mass of a polyol having a covalent organic framework structure in its molecular structure, 230-270 parts by mass of at least one of polyether triol with a molecular weight of 300-500 and polyether triol with a molecular weight of 1000-1500, 4-7 parts by mass of deionized water, 8-12 parts by mass of a catalyst, and 120-130 parts by mass of at least one of polypropylene glycol, polytetrahydrofuran diol, polycaprolactone diol and polycarbonate diol by stirring, to yield the component B.

5. The preparation method of the flexible gastight material for the landfill site according to claim 4, wherein preparation of the component B comprises the following steps:
mixing thoroughly 2.0 parts by mass of a polyol having a covalent organic framework structure in its molecular structure, 250 parts by mass of at least one of polyether triol with a molecular weight of 300-500 and polyether triol with a molecular weight of 1000-1500, 5 parts by mass of deionized water, 10 parts by mass of a catalyst, and 125 parts by mass of at least one of polypropylene glycol, polytetrahydrofuran diol, polycaprolactone diol and polycarbonate diol by stirring, to yield the component B.

6. A method of a flexible gastight material for a landfill site, wherein components A and B are screw mixed by a high-pressure two-component spraying device with screw mixing to obtain prepared components A and B, and the prepared components A and B are sprayed to a location in the landfill site where gas sealing is required using a high-pressure two-component spraying device with screw mixing; wherein the prepared components A and B is accurately metered to have a mass ratio of component A:component B of (1-2):1, and has a spraying amount being controlled at 0.5-2 kg/m$^2$; after spraying, the prepared components A and B self-foam within 0.5-2 hours to produce the flexible gastight material with good gas sealing performance;
wherein the components A and B are obtained through the preparation method according to the claim 1.

* * * * *